United States Patent [19]

Riza et al.

[11] Patent Number: 5,410,147
[45] Date of Patent: Apr. 25, 1995

[54] OPTICAL COMMUNICATION SYSTEM USING COPLANAR LIGHT MODULATORS

[75] Inventors: Nabeel A. Riza, Clifton Park; John E. Hershey, Ballston Lake; Amer A. Hassan, Clifton Park, all of N.Y.

[73] Assignee: General Electric Company, Schenectady, N.Y.

[21] Appl. No.: 932,819

[22] Filed: Aug. 20, 1992

[51] Int. Cl.⁶ ............................................. G02F 1/13
[52] U.S. Cl. ........................ 250/214 LS; 250/227.21; 359/124
[58] Field of Search ................ 250/214 LS, 227.21; 359/118, 123, 124, 135, 136

[56] References Cited

U.S. PATENT DOCUMENTS

| | | | |
|---|---|---|---|
| 3,218,390 | 11/1965 | Bramley | 359/135 |
| 3,363,103 | 7/1965 | Fowler et al. | 359/135 |
| 3,755,676 | 8/1973 | Kinsel | 359/135 |
| 4,691,312 | 9/1987 | Vlasak | 359/135 |
| 4,699,468 | 10/1987 | Harasim et al. | 359/124 |
| 4,867,522 | 9/1989 | Cassidy | 359/124 |
| 5,047,845 | 9/1991 | Tomlinson et al. | 358/90 |

OTHER PUBLICATIONS

"A Novel Multi-Dimensional Signaling Technique for Multiple Access Laser Communications", N. A. Riza, J. E. Hershey, A. A. Hassan, Technical Information Series, 92CRD065, GE Research & Development Center, Mar., 1992, pp. 1-17.

Optical Signal Processing edited by Joseph L. Horner (1987), Chapters 2.1, D. Casasent; 2.2, H. Bartelt; and 7.2, C. Warde and A. D. Fisher.

Image Recognition by Holography, G. I., Vasilenko, L. M. Tsibul'kin, Chapter 3, (1988).

Primary Examiner—David C. Nelms
Assistant Examiner—Stephone Allen
Attorney, Agent, or Firm—Marvin Snyder

[57] ABSTRACT

An optical communications system includes apparatus for interferometric signaling in which light signals are propagated from a first location so as to form at least one predetermined interference pattern at a second location remote from the first location and then the received light signals are demodulated at the second location. The apparatus includes a substantially coherent light source and a plurality of adjacent, substantially coplanar optical modulators in the path of the emitted light.

13 Claims, 5 Drawing Sheets

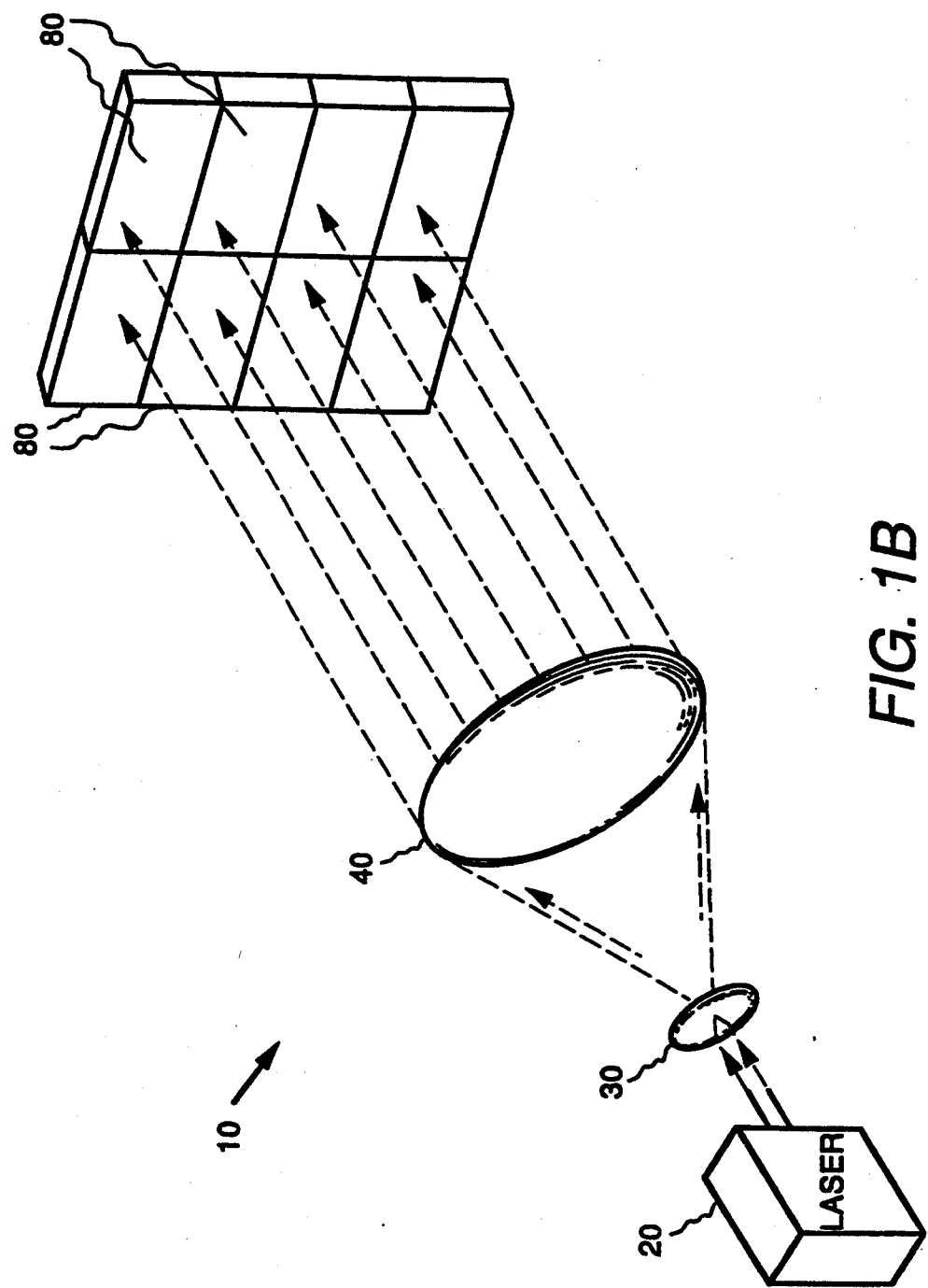

OPTICAL COMMUNICATION SYSTEM USING COPLANAR LIGHT MODULATORS

BACKGROUND OF THE INVENTION

1. Field of the Invention

The present invention relates to optical communications, and, more particularly, to an optical communications system for multiple users or transmitters.

2. Background Information

A major area of development in light or optical communications concerns multiple access communications, i.e., a mechanism by which multiple users may share the same communications channel. This has been done successfully in optical communications with frequency division (FDMA) and time division multiplexing techniques (TDMA). Optical TDMA, however, requires synchronization for the transmitters to avoid mutual interference. Optical FDMA, on the other hand, may severely restrict the number of transmitters because of limitations on the availability and range of tunable high powered light sources, such as lasers. A need thus exists for a multiple access optical communications system that does not require transmitter synchronization and is not limited by division of the bandwidth.

SUMMARY OF THE INVENTION

One object of the invention is to provide an optical communications system that permits several transmitters to communicate with the same receiver or receiving aperture.

Another object is to provide an optical communications system that is relatively simple to implement in comparison with optical communications systems employing FDMA.

Still another object is to provide an optical communications system in which a large number of transmitters may operate aperiodically and with small duty cycles.

One more object is to provide an optical communications system capable of being used with multiple receivers and multiple transmitters, such as with local area fiber optics networks or for identify friend or foe (IFF) signaling.

Yet another object is to provide an optical communications system with a channel capacity exceeding that currently available.

In accordance with the invention, an optical communications system includes apparatus for interferometric signaling comprising a substantially coherent light source and a plurality of adjacent, substantially coplanar optical modulators for encoding the light incident upon the modulators. A method for coding light signals in accordance with the invention comprises the steps of propagating a plurality of light signals from a first location so as to form at least one predetermined interference pattern at a second location remote from the first location and demodulating the light signals received at the second location.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may best be understood by reference to the following detailed description when read with the accompanying drawings in which:

FIG. 1B is a schematic diagram of an alternative embodiment of a device for interferometric signaling for incorporation in an optical communications system in accordance with the invention.

DETAILED DESCRIPTION OF THE INVENTION

An optical communications system in accordance with the present invention provides a space-time signaling or coding technique particularly suited for private, multiple access optical communications. In radio frequency code division multiple access (CDMA) the same channel or bandwidth may support simultaneous transmission by many users. The users are "sorted out" or discriminated by different signaling waveforms that have low cross correlations, as described in *Spread Spectrum Communications*, Vol iii, M. K. Simon, J. K. Omura, R. A. Scholtz, and B. K. Levitt, Computer Science Press, 1985, *Satellite communications*, R. M. Garliardi, *Lifetime Learning Publications*, 1984, and *Coherent Spread Spectrum Systems*, J. K. Holmes, John Wiley & Sons, 1982. In optical communications, by contrast, short wavelengths of light, such as light in the range from infrared to ultraviolet, may provide the basis for interferometric signaling by spatially encoding the light. An interferometric signal encoder, for example, may include a substantially coherent light source, such as a laser, electrical or electronic circuitry to perform the interferometric signal modulation, and optical elements. Likewise, an interferometric signal decoder may include components for performing incoherent optical and signal processing to interferometrically decode the signal.

Figure 1A:
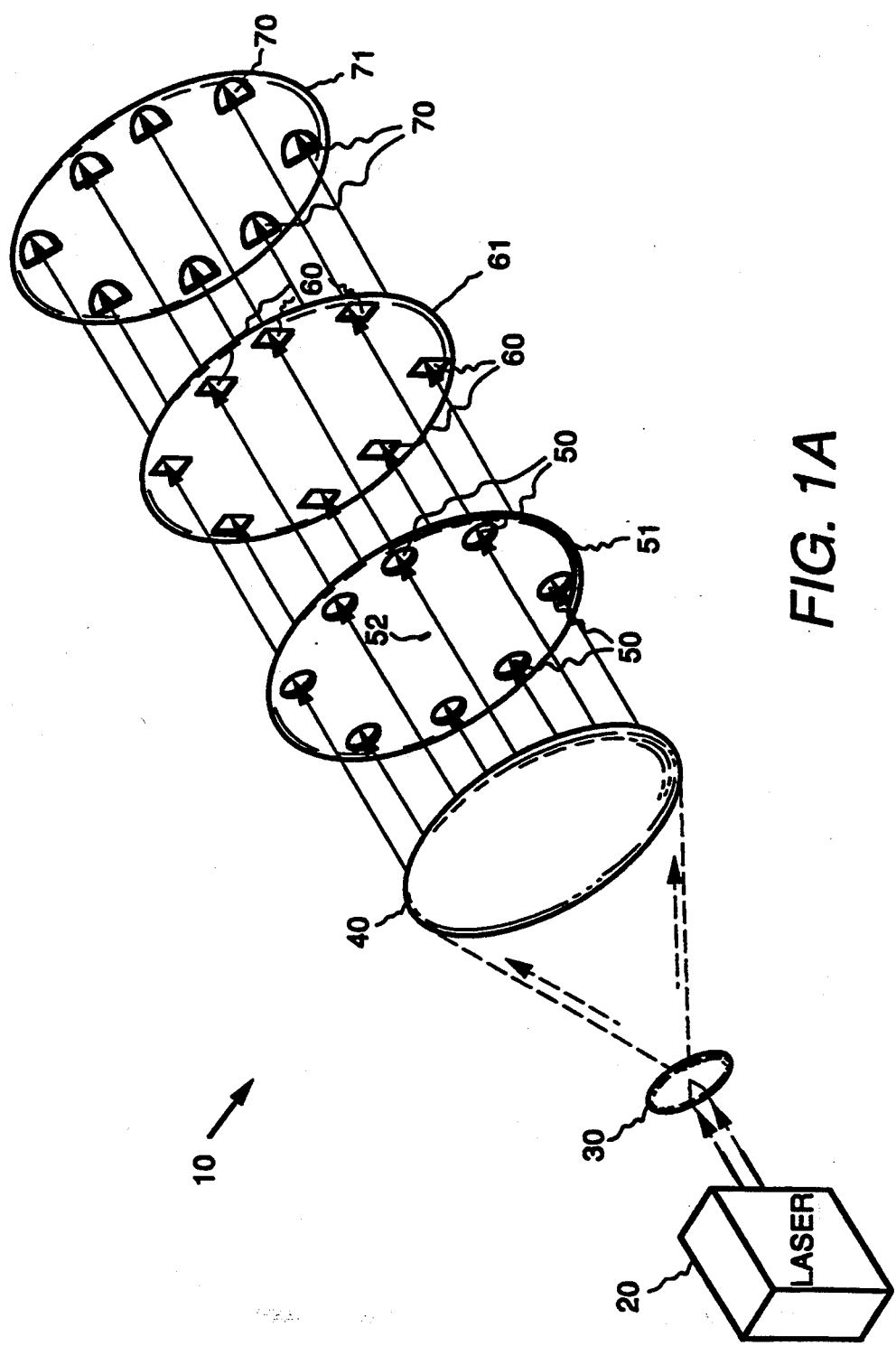
FIG. 1A is a schematic diagram of an embodiment of a device for interferometric signaling for incorporation in an optical communications system in accordance with the invention.

FIG. 1A depicts an interferometric encoder 10 for incorporation in an optical communications system in accordance with the invention. Substantially coherent light from an emitter or source, such as a laser 20, which may incorporate conventional temporal signaling, such as pulse position modulation, or a more sophisticated temporal modulation, such as CDMA, as described in *A Semiclassical Analysis of Optical Code Division Multiple Access*, D. Brady and S. Verdu, *IEEE Transactions on Communications*, Vol. 39, No. 1, January 1991, pp. 85-93, may be respectively expanded and collimated using a beam diverger 30 and a beam former 40. The collimated light beam from beam former 40 is incident upon an array of lenses 50 that provide a plurality of beams, such as arranged in a circular format about a center 52, as illustrated in FIG. 1A. It will be appreciated that the format of the beams is not limited to a circular arrangement. As illustrated, the array of lenses 50 comprises a ring of equiangularly spaced circular lenses mounted on a disk 51 that act as light apertures, each of which provides beam focusing at a respective optical modulator 60. A plurality of adjacent, substantially coplanar, optical modulators 60, liquid crystal (LC) cells in this instance, are oriented at an angle, such as 90°, with respect to the path of the emitted light and are arranged in an array on a disk 61. Using focussed beams with the LC cells or pixels has the advantage of avoiding severe edge-diffraction effects. Each optical modulator may alternatively comprise a film, such as photographic film, for modulating the incident light.

FIG. 1A illustrates a 1:1 correspondence between the LC cells and the number of beams provided by the array of lenses 50 although the invention is not limited to this 1:1 correspondence. In this particular embodiment, the center of each lens is spaced a predetermined distance from the center 52 of the array of lenses 50, and each LC cell introduces a phase shift onto that portion of the laser beam passing through the respective window 60, such as with parallel-rub nematic liquid crystal cells. This embodiment of the invention employs phase modulation with two phase shifts, 0 and $\pi$ radians. Alternative embodiments of the invention may also introduce magnitude modulation separately or in conjunction with phase modulation. After phase modulation by the LC cells, the diverging optical beams may be recollimated, such as by the array of lenses 70 on a disk 71. The collimated beams arranged in an equi-angular circular format emerging from array of lenses 70 have the appearance of spatially encoded mutually coherent point sources that radiate simultaneously into free space, such as in the direction of a ground-based or spaced-based optical receiver. It will now be appreciated that so long as at least one of the optical modulators alters light incident upon it by modifying either the phase of the incident light, the amplitude of the light, or both, an interferometrically encoded light signal may be provided.

FIG. 1B illustrates an alternative embodiment of an interferometric encoder for incorporation in an optical communications system in accordance with the invention. As illustrated in FIG. 1B, instead of array of lenses 50, array of optical modulators 60, and array of lenses 70 illustrated in FIG. 1A, this embodiment includes an array of optical modulators 80, such as LC cells, ganged in a rectangular format. Likewise, such an array may be used with focusing and recollimating lens arrays and may be used for amplitude as well as phase modulation.

At a remote location which may be in the far-field of the optical point sources, at least one interference pattern is formed by propagating a plurality of light signals from a first location to the remote location, much like the interference fringes of a Young's two-slit interferometer, as described in *Optics*, E. Hecht, Edison-Wesley, 2nd Edition, 1988. In this particular embodiment the interference pattern obtained at the detector plane or light gathering aperture of a remote receiver is determined by the phase-shifts, i.e., the code settings for the different phase modulated beams, the spatial positions of the beams at the transmitter, and the free-space beam travel distances. By simply using spatial amplitude or phase-based coding or both together, the received light signal is spatially coded via far-field interference effects. Because the far-field interference pattern is known for a particular spatial code, a receiver may have the capability to crosscorrelate the received spatial interference intensity pattern with previously stored spatial intensity patterns to achieve user discrimination and to decode the signal. Further discrimination may be achieved if the signal is also temporally coded, as previously described.

Figure 2:
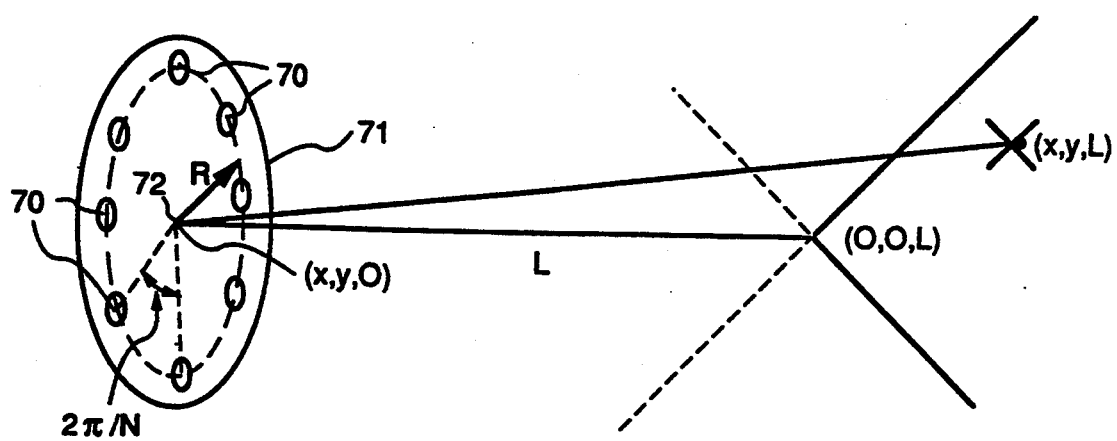
FIG. 2 illustrates a typical geometric arrangement for interferometric signaling between a transmitter and a receiver.

For an optical communications system in accordance with the present invention, the intensity I(x,y,L) of the light at a point (x,y,L), on a plane parallel to the plane of an array of optical modulators, such as array of lenses 70 illustrated in FIG. 1A, will be proportional to the product EE*, where E is the electric vector E=E(x,y,L) and E* is its complex conjugate. A typical geometry is illustrated in FIG. 2. Assuming the lenses resemble spatial point sources, such as delta functions, in the far-field region, and that L is substantially larger than R,x, and y, R being the radius of the array of lenses about a central point 72, then E(x,y,L), may be approximated as $$E(x,y,t,L) \approx \sum_{p=1}^{N} \alpha_p \exp\{j[wt + \phi_p(x,y,L)]\}$$

where the $\{\alpha_p\}$ are the complex values associated with optical modulations due to the p-th LC cell/point source, with $\alpha_p = r_p \cdot e^{-jw_p}$, $r_p$ being the amplitude modulation and $w_p$ being the phase modulation (for example, for a zero radian phase shift, $\alpha_p = +1$, while for a $\pi$ radian phase shift, $\alpha_p = e^{j\pi} = -1$.)

w is the angular frequency of the light source,

N is the number of lenses in the array, t is time, and $\phi_p(x,y,L)$ is the phase shift, in radians, acquired from optical propagation flow from the p-th lens to the point (x,y,L).

The expression for $\phi_p(x,y,L)$ is given as $$\phi_p(x,y,L) = \frac{wL}{c} \sqrt{\left(\frac{x - R\cos\theta_p}{L}\right)^2 + \left(\frac{y - R\sin\theta_p}{L}\right)^2 + 1}$$

where c is the speed of light. Using the well known Fresnel approximation, the square root is approximated by $$\phi_p(x,y,L) \approx \frac{w}{2Lc}[(x - R\cos\theta_p)^2 + (y - R\sin\theta_p)^2],$$

where the fixed phase shift at the receiver $e^{jkL}$, with k=w/c, is omitted. In this particular embodiment, the $\{\alpha_p\}$ are either +1 or $-1$ corresponding to the 0 or $\pi$ radians point source phase shifts, respectively, and $$\theta_p = \frac{2\pi p}{N}.$$

Thus, I(x,y,L) is proportional to $$\sum_{p=1}^{N} \alpha_p \sum_{q=1}^{N} \alpha_q \cos \frac{R}{L} \frac{w}{c} [(\cos\theta_p - \cos\theta_q)x + (\sin\theta_p - \sin\theta_q)y]$$

In the context of the present invention, a particular selection for $\{\alpha_p\}$ refers to an interferometric signaling mask or spatial code. The expression immediately above thus provides the Fraunhofer diffraction pattern of the spatially coded aperture at the receiver based on coding provided at the transmitter.

Figure 3:
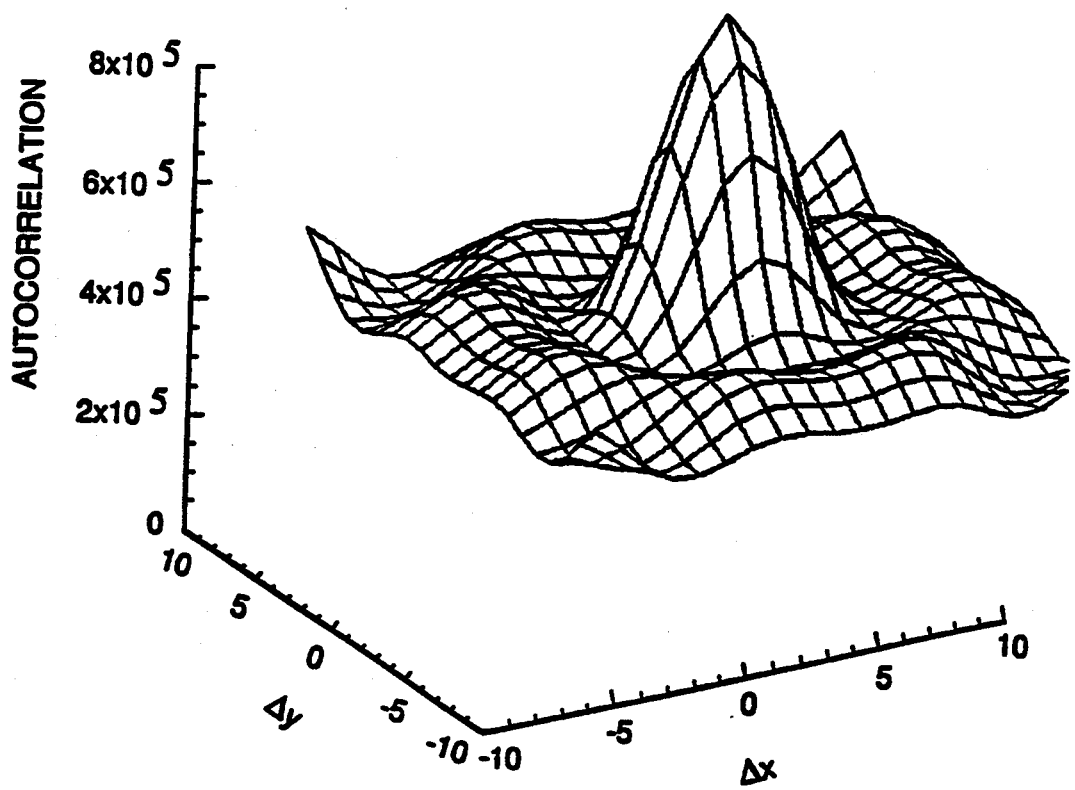
FIG. 3 illustrates the autocorrelation of the interference intensity pattern for a particular interferometric signaling mask in an embodiment of the invention.

FIG. 3 displays a scaled autocorrelation of the interference intensity pattern at the receiver provided by the signaling mask $+1-1-1+1+1-1-1+1$ over an approximately 0.6 m $\times$ 0.6 m area for an embodiment of the present invention in which R=1 cm, L=2 km, $\omega \approx 3 \cdot 10^{15}$ Hz, such as from a helium-neon laser source, and N=8. As provided above, +1 indicates a phase shift of 0 radians and $-1$ indicates a phase shift of $\pi$ radians. The $\{\alpha_p\}$ for the eight signaling masks were arbitrarily chosen to be the 8 rows of the Walsh-Hadamard matrix of order eight. The Walsh-Hadamard matrix of order $2^n$, $H_{2n}$, is defined by the recursive Cartesian product $H_{2n} = H_2 \oplus H_{2n} - 1$ where $H_2 =$ $$H_2 = \begin{pmatrix} +1 & +1 \\ +1 & -1 \end{pmatrix}.$$

This autocorrelation is given by the integral $$R(\Delta x, \Delta y) = \iint I(x,y,L) I(x+\Delta x, y+\Delta y) dx dy$$

The units on the $\Delta x$, and $\Delta y$ axes are, in this particular embodiment, 10 cm.

Figure 4:
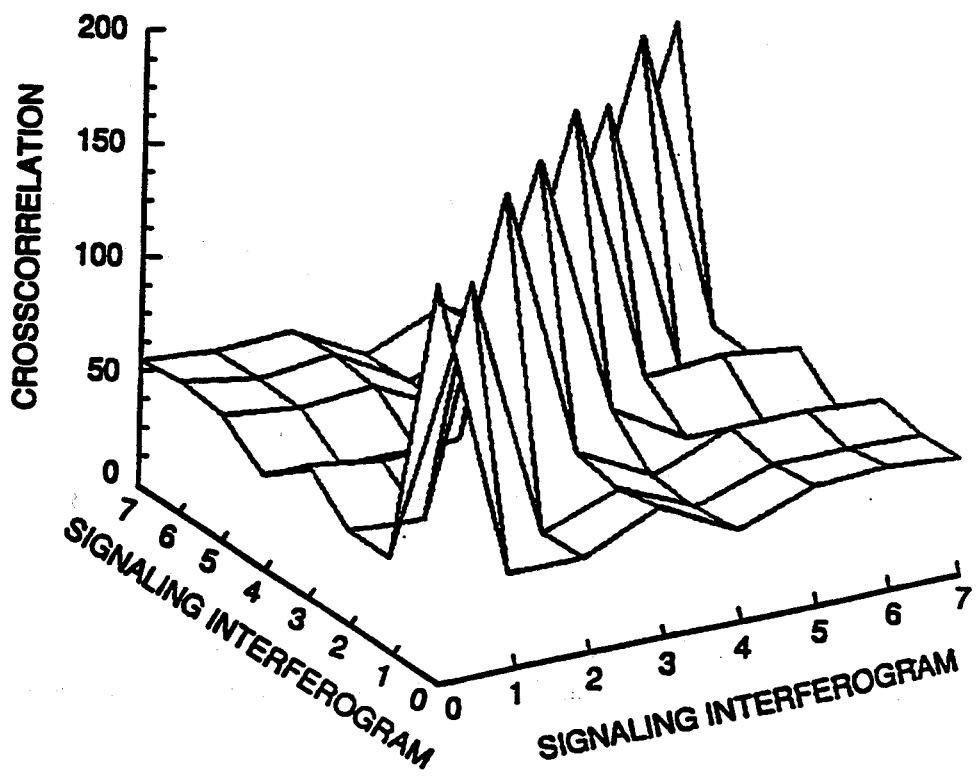
FIG. 4 illustrates the autocorrelation and crosscorrelations for eight particular interferometric signaling masks in an alternative embodiment of the invention.

FIG. 4 displays the cross and autocorrelations of the eight interference intensity patterns when properly aligned. The autocorrelations are the peaks on the diagonal and the crosscorrelations are the off-diagonal values, given by the integral $$\iint I_i(x,y,L) I_j(x,y,L) dx dy$$

where i and j designate the interferometric signaling or "mask" designations.

An optical communications system employing interferometric signaling may be used with many conventional optical signaling techniques, such as pulse position modulation and pulse duration modulation. Furthermore, interferometric signaling has several useful features. First, the intensity functions, $\{I_i(x,y,L)\}$, transmitted via different codes or signaling masks will effectively add as the light sources are incoherent with respect to each other when integration is performed over any reasonable signaling period. Second, the interferometric decoder at the receiver need not be designed for coherent light, e.g., it may simply be a distributed set of light sensitive sensors. This permits inexpensive extended receiving aperture construction, such as might be required for ground-to-satellite applications. Third, because the interferometric decoder correlates the intensity function present at the receiving aperture with stored templates or intensity patterns, interferometric signaling may provide protection against optical interference.

In the embodiment of the invention illustrated in FIG. 1A, detection and demodulation of the information being sent by one or more transmitters may proceed as follows. Optical or light sensitive detectors at the receiver spatially sample the interference intensity pattern across the aperture typically at a rate that appreciably exceeds the maximum signaling rate. Apparatus for such detection may comprise a plurality of adjacent, substantially coplanar, optical detectors oriented at a predetermined angle with respect to the path of the light, such as ninety degrees, so that different portions of the light are incident upon different optical detectors. The detectors integrate the photocurrents or detector outputs during a sampling period. At the end of each sampling period, the accumulated charges may be measured, quantized, and provided to a signal processor, such as an electronic or optical signal processor for performing a matched filter operation. At the end of each sampling period, the processor correlates the sampled intensity pattern against each interferometric signaling pattern or mask. Finally, the processor indicates a particular pattern as being present if the pattern's crosscorrelation to the sampled intensity pattern exceeds a specified threshold, and not present otherwise. By this method, apparatus for interferometric decoding may sort out multiple transmissions to a single aperture. Interferometric signaling exhibits graceful degradation, i.e. the effective noise and hence the probability of symbol error increases gradually with the number of simultaneous users. Likewise, sophisticated algorithms are possible; apparatus for interferometric decoding may, for example, first estimate the number of users during a sampling period and then perform a maximum likelihood estimation of the interferometric signaling patterns present based on the number of users.

Figure 5:
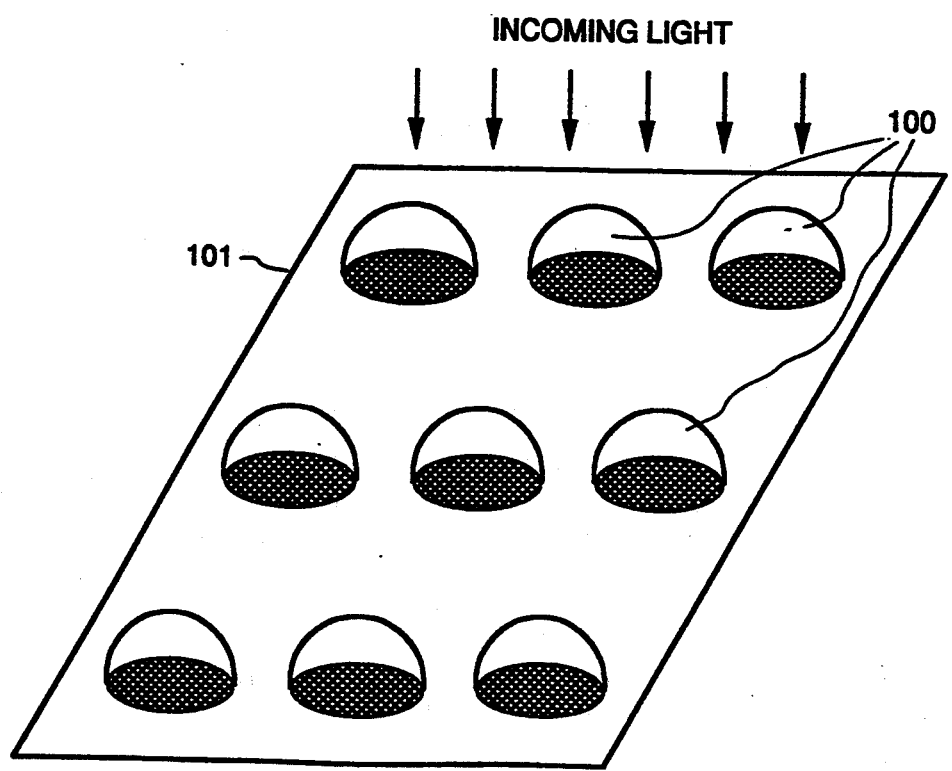
FIG. 5 is a schematic diagram of an embodiment of a device for interferometrically decoding a transmitted light signal for incorporation in an optical communications system in accordance with the invention.

As previously described, apparatus for interferometric decoding for incorporation in an optical communications system in accordance with the present invention may operate satisfactorily with incoherent light, as well as coherent light, permitting use of a relatively inexpensive receiver for large extent apertures, such as might be desirable for a satellite. FIG. 5 illustrates such an embodiment. Each of the elements 100 of array 101 is a half-sphere comprised of a transparent material with an appropriate refractive index such that the half-sphere focuses substantially all of the incoming light onto a photosensitive sensor (not shown) positioned at the center of the bottom of the half-sphere. The half-spheres may be densely packed so that the receiving aperture provides efficiency. For optical communications over substantial distances, such as from ground-to-satellite, such apparatus may be of spatial extent greater than the signaling pattern so that the pattern may be tracked as the beam wanders or as it is initially acquired. This feature allows highly accurate satellite tracking and positioning. Furthermore, interferometric signaling provides a number of possibilities for accomplishing initial acquisition. For example, a signaling mask may be used for initial spatial synchronization and the liquid crystal devices or other optical sensors may correlate this particular mask during synchronization. Thus, the decoder may search for this particular pattern and when found, the receiver may either lock onto it and track it, or work with the ground station of the transmitter through a feedback loop to center it and keep it centered on the receiving aperture. Initial synchronization may be performed with an unmodulated laser beam.

Figure 6:
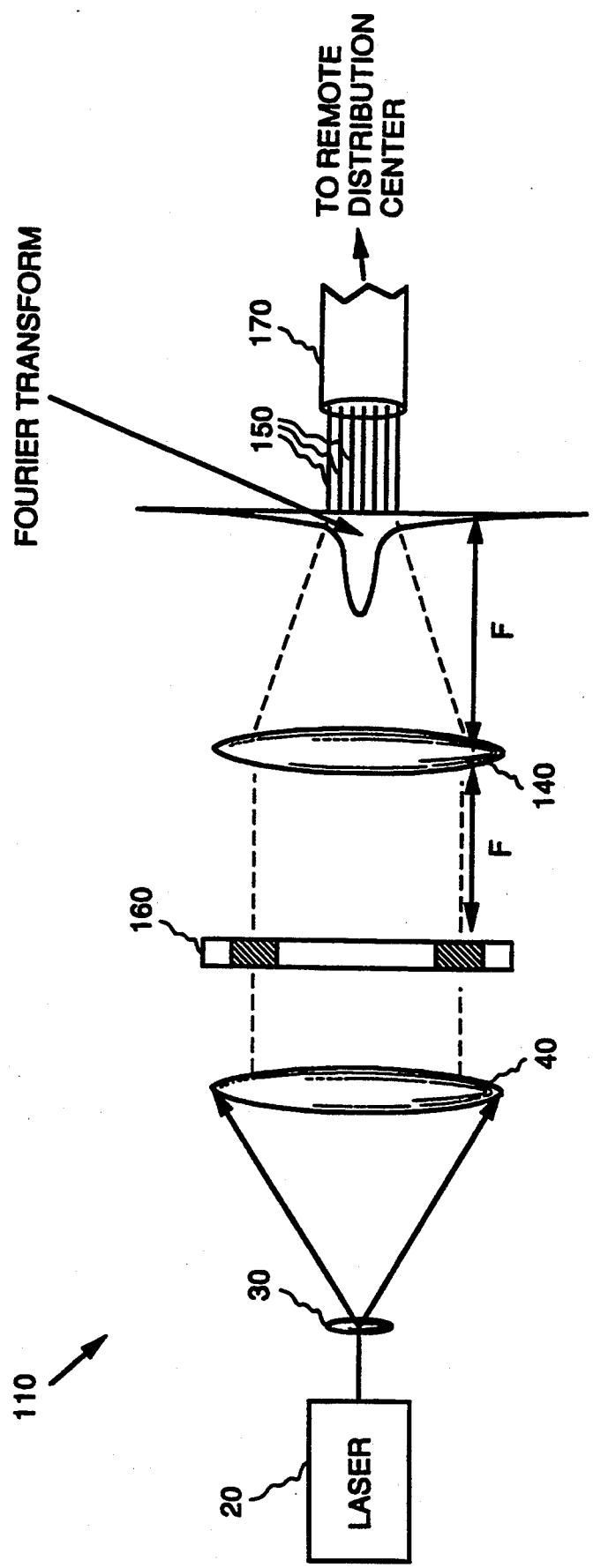
FIG. 6 is a schematic diagram of yet another alternative embodiment of a device for interferometric signaling for incorporation in an optical communications system in accordance with the invention.

In an alternative embodiment of the invention, an optical communications system employing interferometric signaling, such as interferometric encoder 110 illustrated in FIG. 6, may be adapted for use with fiber-optic based local area networks. In this particular embodiment, the free-space Fraunhofer diffraction pattern, as previously described, is produced by including a spherical lens 140. The lens produces the Fourier transform of the light incident upon it and thus has a similar effect on the transmitted light as propagation through free space. As shown in FIG. 6, in this particular embodiment the desired interferometric signaling or spatial code mask is imposed by an LC optical modulator 160, and the resulting spatial Fourier transform pattern is then transferred to a remote distribution center via a multi-fiber cable 170. Here, each optical fiber 150 in multi-fiber cable 170 acts as a point sampler. At the remote end of multi-fiber cable 170, the received light distribution is crosscorrelated with various known spatial masks corresponding to a different code for each user. Depending upon the particular spatial code correlations, different messages are recovered and routed to the appropriate users. Likewise, for this particular embodiment, a group of users might share the same spatial mask and achieve intra-mask isolation by temporal coding with modulation sequences exhibiting low temporal crosscorrelation. For example, codes with large Hamming distances offer maximum errors and erasures correction. Due to practical implementation issues, interferometric signaling using fiber-optics is most economic when the number of fibers in the multi-fiber cable is limited to a small number, although the invention is not so limited in scope. The small number of fibers does not, however, drastically limit the number of possible users.

The remote-decoder may take any one of a number of possible embodiments. For example, such a decoder may comprise a plurality of charge-coupled devices (CCD). Alternatively, the device may comprise a 2-dimensional high speed photodiode array when high speed processing is desirable. A computer or signal processor, such as a digital signal processor, may then compute the crosscorrelations using the stored spatial codes or masks to determine which users are active based on the received intensity pattern. Appropriate control signals then (re)generate and route the recovered data messages to the appropriate recipients.

As described for the first embodiment, in the embodiment of FIG. 6 the optical modulators may be used in a 1:1 imaging mode with the multi-fiber cable. The optical modulators may comprise a twisted nematic liquid crystal cell array sandwiched between cross polarizers to provide the desired amplitude modulation required for the fiber-based coding technique. As will be appreciated by those skilled in the art, for a fiber-optics network as previously described phase modulation of the light may not be employed to spatially encode the signals.

An optical communications system in accordance with the present invention accomplishes signaling in three dimensions per signaling interval: two spatial dimensions, and a time dimension; in contrast with one dimension, i.e., time, for a conventional communications systems. Thus, to achieve multidimensional signaling in a conventional communications system, multiple signaling is used. For a communications system in accordance with the invention, if the dimension of the signaling waveform is D, then the number of available dimensions per signaling interval is $D^3$. Thus, as will be appreciated by one skilled in the art, a large minimum Hamming distance is easier to obtain in higher dimensional signaling. For example, as is well-known, an extended Reed-Solomon code is a code with an alphabet size equal to the block length. Thus, in another embodiment of the present invention, the array may include a number of optical modulators arranged to correspond with the block length of the Reed-Solomon code. Then each symbol is further encoded by a convolutional code, resulting in a spatial block code and a temporal convolutional code. Where $d_{rs}$ is the minimum distance of the Reed-Solomon code and $d_{con}$ is the minimum free distance of the convolutional code, the minimum distance of the combined concatenated code is underbounded by the product $d_{rs}d_{con}$. It is thus valuable to chose good concatenated codes, one code in time and the other in space. For maximum errors and erasures correction, however, the number of array elements may be much larger than the code length of the block code to provide for user discrimination codes with a large Hamming distance.

Finally, another embodiment of the present invention may prove valuable for identify friend or foe (IFF) signaling in many possible situations, such as single transmitter/single receiver, multiple transmitter/single receiver, single transmitter/multiple receivers, and multiple transmitters/multiple receivers. Moreover, the transmitter(s)/receiver(s) may be ground based or airborne/spaced based. Thus, in one particular embodiment the coding or signaling technique disclosed herein may be used to perform IFF, such as by using laser-based signaling in a single transmitter/multiple receiver environment with an airborne/space based transmitter looking down on multiple ground based receivers. A spatially and temporally coded laser beam emerging from an airborne platform may mechanically or electronically scan a given region on the ground, such as with an optical phased array. Thus, ground based receivers may continually crosscorrelate any impinging optical radiation with known codes. If a code match occurs, an electromagnetic beacon may be transmitted, making identification.

The invention has been described herein in accordance with certain preferred embodiments thereof, many modifications, substitutes, changes and equivalents will now occur to those skilled in the art. For example, a number of possible coding techniques may be employed by an optical communications system in accordance with the present invention. It is intended to cover all such modifications and changes as are within the true spirit and scope of the invention by means of the appended claims.

What is claimed is:

1. Apparatus for use in communications comprising:
   a substantially coherent light source; and
   a plurality of adjacent, substantially coplanar, optical modulators, the plane formed by said modulators being in the path of the light emitted by said source and oriented at a predetermined angle with respect to said path.

2. The apparatus of claim 1, wherein said predetermined angle is approximately ninety degrees.

3. The apparatus of claim 1, wherein at least one of said optical modulators alters the light incident upon it so as to provide an interferometrically encoded light signal.

4. The apparatus of claim 3, wherein said at least one modulator comprises a modulator for altering incident light selected from the group consisting essentially of a phase modulator and an amplitude modulator.

5. The apparatus of claim 3, wherein each of said modulators comprises an electronically controlled liquid crystal cell.

6. The apparatus of claim 3, wherein each of said modulators comprises a film for modulating incident light.

7. The apparatus of claim 3, and further comprising a beam diverger positioned in the path of the light emitted by said source between said source and said modulators and a beam former positioned in the path of the light emitted by said source between said diverger and said modulators.

8. The apparatus of claim 7, and further comprising an array of focusing lenses positioned in the path of the light emitted by said source between said beam former and said modulators for focusing the light passing through said lenses.

9. The apparatus of claim 8, and further comprising an array of recollimating lenses positioned adjacent said modulators for recollimating a portion of the light emerging from said modulators.

10. The apparatus of claim 7, and further comprising a lens positioned adjacent said modulators for transforming a portion of the light leaving said modulators.

11. The apparatus of claim 10, and further comprising a plurality of optical fibers adjacent said lens for transmitting a portion of the light passing through said lens, the flat ends of said fibers adjacent said lens being oriented substantially perpendicular to the direction of propagation of said light portion.

12. A method for transmitting information, comprising the steps of:
   generating a beam of coherent light;
   expanding said beam of coherent light to form an expanded beam;
   collimating said expanded beam to form a collimated expanded beam of light; and
   modulating a plurality of portions of said collimated expanded beam of light by a like plurality of coplanar light modulators located within said collimated expanded beam of light and controlled by mutually independent sources of information, to thereby form a collimated beam of modulated light in which different portions of the beam are modulated by independent information.

13. A method according to claim 12 wherein said step of modulating includes the step of focusing portions of said collimated expanded beam of light onto said light modulators.

* * * * *